United States Patent [19]
Weber et al.

[11] 3,711,467
[45] Jan. 16, 1973

[54] 2-(ALKOXY OR ALKYLMERCAPTO)-5-PHENYL-4H-3,5-DIHYDRO-1,5-BENZODIAZEPIN-4-ONES

[75] Inventors: Karl Heinz Weber, Gau-Algesheim; Adolf Bauer; Peter Danneberg, both of Ingelheim/Rhine; Klaus Minck, Gau-Algesheim, all of Germany

[73] Assignee: Boehringer Ingelheim G.m.b.G., Ingelheim am Rhine, Germany

[22] Filed: Oct. 19, 1971

[21] Appl. No.: 194,002

[52] U.S. Cl. ..................260/239.3 B, 424/244
[51] Int. Cl. ................................C07d 53/04
[58] Field of Search ....................260/239.3 B

[56] References Cited

UNITED STATES PATENTS 3,321,468  5/1967  Krapcho et al..............260/239.3 B

Primary Examiner—John D. Randolph
Assistant Examiner—Robert T. Bond
Attorney—Nelson Littell et al. and Nelson Littell et al.

[57] ABSTRACT

Compounds of the formula

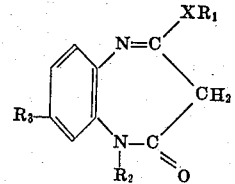

wherein
$R_1$ is straight or branched alkyl of one to four carbon atoms,
$R_2$ is phenyl, o-halo-phenyl, o-nitro-phenyl or o-trifluoromethyl-phenyl,
$R_3$ is halogen, nitro or trifluromethyl, and X is oxygen or sulfur;
the compounds are useful as psychosedatives and as intermediates for the preparation of tranquillizers.

4 Claims, No Drawings

2-(ALKOXY OR ALKYLMERCAPTO)-5-PHENYL-4H-3,5-DIHYDRO-1,5-BENZODIAZEPIN-4-ONES

This invention relates to novel 2-(alkoxy or alkylmercapto)-5-phenyl-4H-3,5-dihydro-1,5-benzodiazepin-4-ones, as well as to methods of preparing these compounds.

More particularly, the present invention relates to a novel class of benzodiazepinones of the formula

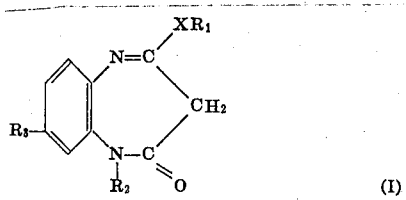

wherein
$R_1$ is straight or branched alkyl of one to four carbon atoms,
$R_2$ is phenyl, o-halo-phenyl, o-nitro-phenyl or o-trifluoromethyl-phenyl,
$R_3$ is halogen, nitro or trifluoromethyl, and
X is oxygen or sulfur.

The compounds embraced by formula I may be prepared by the following methods:

METHOD A

By reacting a 1H-1,5-benzodiazepin-2,4-(3H,5H)-dione of the formula

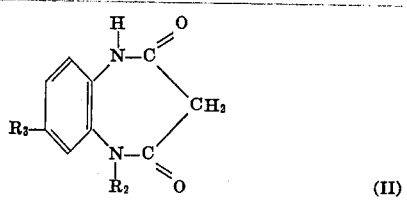

wherein $R_2$ and $R_3$ have the same meanings as in formula I, with a trialkyloxonium fluoroborate in the presence of an inert organic solvent at a temperature between 0°C. and the boiling point of the solvent.

The trialkyloxonium fluoroborate starting compound is prepared from borotrifluoride-etherate and epichlorohydrin by the method of H. Meerwein et al, J. Pr. Chem. (2), 147, 257 (1937), and 154, 83 (1939), and is reacted in situ with the benzodiazepinone of the formula II.

METHOD B

By reacting a compound of the formula II with the inorganic acid halide, preferably phosphorus pentachloride, in the presence of an anhydrous inert organic solvent, such as dioxane or tetrahydrofuran, at a temperature between −50° and +50°C. to form the corresponding imide halide, and treating the latter in situ with an alkali metal alcoholate.

METHOD C

By reacting an alkali metal salt of a benzodiazepin-4-one-2-thione of the formula

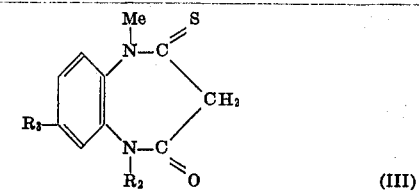

wherein $R_2$ and $R_3$ have the same meanings as in formula I and Me is alkali metal, with a conventional alkylating agent, such as an alkyl halide, a dialkyl sulfate or a dialkyl p-toluenesulfonate, in the presence of an inert organic solvent, such as tetrahydrofuran, dioxane or ethanol, at a temperature between 0°C. and the boiling point of the particular solvent.

In this case the starting compound of the formula III is prepared by selective sulfurization of the corresponding benzodiazepine-2,4-dione according to known methods, such as with phosphorus pentasulfide in pyridine at a temperature between 20°C. and the boiling point of pyridine. The benzodiazepine-2,4-dithione formed as a side product may readily be separated from the reaction product mixture, for example, by chromatography on a silicagel column. The alkali metal salt is obtained by treatment of the benzodiazepin-4-one-2-thione with an alkali metal hydride, such as sodium hydride, or with an alkali metal alcoholate.

The following examples further illustrate the present invention and will enable others skilled in the art to understand it more completely. It should be understood, however, that the invention is not limited solely to the particular examples given below.

EXAMPLE 1

2-Ethoxy-5-phenyl-7-trifluoromethyl-4H-3,5-dihydro-1,5-benzodiazepin-4-one by method A 5 gm of boron trifluoride etherate were dissolved in 250 ml of pure chloroform, the resulting solution was admixed with a solution of 2.5 gm of epichlorohydrin in 10 ml of chloroform, and the mixed solution was stirred for 15 to 20 minutes, whereby the corresponding trialkyloxonium fluoroborate complex separated out as a colorless greasy substance. Without separating the complex, a solution of 8 gm of 5-phenyl-7-trifluoromethyl-1,5-benzodiazepine-2,4-dione in 500 ml of chloroform was now added at room temperature, whereby the complex went into solution again, and after 15 to 20 minutes of standing at room temperature, crystals began to separate out. In order to complete the reaction, the mixture was stirred for 20 to 24 hours at room temperature, and then, while cooling and vigorously stirring, 20 ml of an aqueous 50 percent potassium carbonate solution was added. Thereafter, the organic phase was separated, washed with water and evaporated. The residue was recrystallized from isopropylether, yielding 4.4 gm (50.5 percent of theory) of a colorless crystalline substance, m. p. 145°–147°C., which was identified to be the compound of the formula

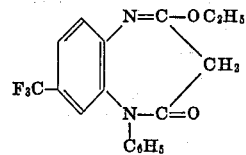

EXAMPLE 2

2-Isopropoxy-5-phenyl-7-trifluoromethyl-4H-3,5-dihydro-1,5-benzodiazepin-4-one by method A 20 gm of boron trifluoride were introduced into 100 ml of diisopropyl ether at about 60°C., and the mixture was cooled to 40°C., whereupon the corresponding boron trifluoride etherate separated out, partially in crystalline form. While maintaining the mixture at 40°-50C., 20.3 gm of epichlorohydrin were added dropwise thereto, and the resulting red solution was admixed with a solution of 8 gm of 5-phenyl-7-trifluoromethyl-1,5-benzodiazepine-2,4-dione in 500 ml of chloroform. The mixed solution was then stirred for 4-5 hours at room temperature and subsequently worked up as described in Example 1, yielding 4 gm (45 percent of theory) of the compound, m. p. 192°-193°C., of the formula

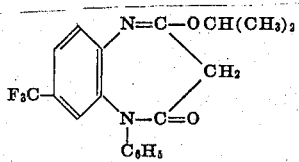

EXAMPLE 3

2-Ethoxy-7-chloro-5-phenyl-4H-3,5-dihydro-1,5-benzodiazepin-4-one by method B 10 gm of 5-phenyl-7-chloro-1,5-benzodiazepine-2,4-dione were dissolved in 1 liter of pure dioxane, 0.2 ml of dimethylformamide were added to the solution, the resulting mixture was cooled to 15°C., 40 gm of phosphorus pentachloride were added, and the mixture was allowed to stand for 20-30 minutes, whereupon a milky turbid suspension was obtained. This suspension was allowed to flow at −10° to 0°C. into a sodium ethylate solution (10 gm of sodium in 300 ml of ethanol), and after 15 minutes of standing the resulting solution was evaporated to dryness, the residue was extracted with methylene chloride, the methylene chloride extracts were evaporated, and the residue was recrystallized from methanol. 6 gm (52 percent of theory) of the compound, m. p. 97°-100°C., of the formula

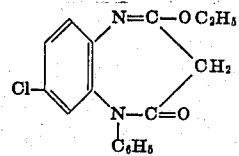

were obtained.

EXAMPLE 4

2-Methylmercapto-5-phenyl-7-trifluoromethyl-4H-3,5-dihydro-1,5-benzodiazepin-4-one by method C a. 19.2 gm (0.06 gm-mol) of 5-phenyl-7-trifluoromethyl-1,5-benzodiazepine-2,4-dione were dissolved in 150 ml of pyridine, the solution was admixed with 14 gm of phosphorus pentasulfide, and the mixture was refluxed for 2 hours. Thereafter, the reaction mixture was poured into an ice-cold saturated aqueous sodium chloride solution, the crystalline precipitate formed thereby was collected by vacuum filtration, and the filter cake was thoroughly washed with water and then dried at 100°C. in vacuo. The raw reaction product (21 gm) obtained thereby was dissolved in methylene chloride, and the solution was passed through a silicagel column. The column was eluated with methylene chloride to which 3 percent by volume of methanol had been added, and the eluate fractions were worked up in conventional manner, yielding 7.0 gm of 5-phenyl-7-trifluoromethyl-1,5-benzodiazepin-4-one-2-thione, m. p. 251°-253°C., and 2.9 gm of 5-phenyl-7-trifluoromethyl-1,5-benzodiazepine-2,4-dithione, m. p. 282°-283°C.

b. 7.0 gm of 5-phenyl-7-trifluoromethyl-1,5-benzodiazepin-4-one-2-thione were dissolved in 200 ml of tetrahydrofuran, the resulting solution was admixed with a 50 percent solution of 1.2 gm of sodium hydride in oil, and the mixture was allowed to stand for 10-15 minutes. Thereafter, 3.6 gm of methyl iodide were added, and the resulting mixture was stirred for 1 hour at 40°C. Subsequently, the reaction mixture was evaporated, the residue was taken up in methylene chloride, the resulting solution was washed twice with water, dried and evaporated, and the residue was recrystallized from isopropylether, yielding 4.8 gm (48 percent of theory) of the colorless crystalline compound, m. p. 177°-179°C., of the formula

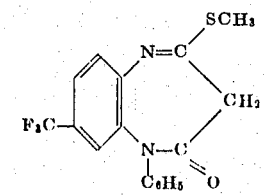

EXAMPLE 5

Using a procedure analogous to that described in Example 3, 2-ethoxy-5-phenyl-7-bromo-4H-3,5-dihydro-1,5-benzodiazepin-4-one, m. p. 142°-143°C., of the formula

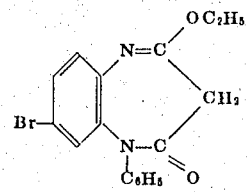

was prepared from 5-phenyl-7-bromo-1,5-benzodiazepine-2,4-dione and phosphorus pentachloride.

EXAMPLE 6

Using a procedure analogous to that described in Example 1, 2-ethoxy-5-phenyl-7-nitro-4H-3,5-dihydro-1,5-benzodiazepin-4-one, m. p. 182°-184°C., of the formula

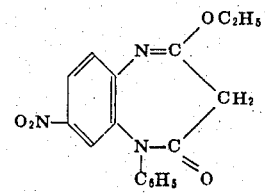

was prepared from 5-phenyl-7-nitro-1,5-benzodiazepine-2,4-dione.

EXAMPLE 7

Using a procedure analogous to that described in Example 1, 2-methoxy-5-phenyl-7-trifluoromethyl-4H-3,5-di-hydro-1,5-benzodiazepin-4-one, m. p. 174°–175 °C., of the formula

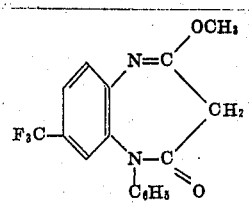

was prepared from 5-phenyl-7-trifluoromethyl-1,5-benzodiazepine-2,4-dione and trimethyloxonium fluoroborate.

EXAMPLE 8

Using a procedure analogous to that described in Example 2, 2-n-butoxy-5-phenyl-7-trifluoromethyl-4H-3,5-dihydro-1,5-benzodiazepin-4-one, m. p. 98°–99°C., of the formula

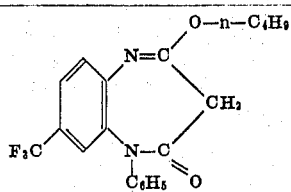

was prepared from 5-phenyl-7-trifluoromethyl-1,5-benzodiazepine-2,4-dione and dibutyl ether.

EXAMPLE 9

Using a procedure analogous to that described in Example 3, 2-ethoxy-5-(o-chloro-phenyl)-7-chloro-4H-3,5-dihydro-1,5-benzodiazepin-4-one, m. p. 191°–192 °C., of the formula

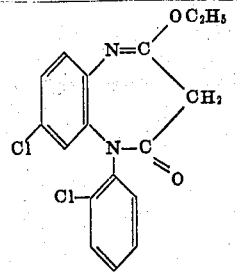

was prepared from 5-(o-chloro-phenyl)-7-chloro-1,5-benzodiazepine-2,4-dione.

EXAMPLE 10

Using a procedure analogous to that described in Example 3, 2-ethoxy-5-(o-fluoro-phenyl)-7-chloro-4H-3,5-di-hydro-1,5-benzodiazepin-4-one, m. p. 128°–130 °C., of the formula

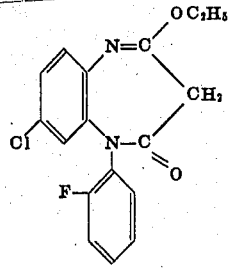

was prepared from 5-(o-fluoro-phenyl)-7-chloro-1,5-benzodiazepine-2,4-dione.

EXAMPLE 11

Using a procedure analogous to that described in Example 3, 2-ethoxy-5-(o-bromo-phenyl)-7-chloro-4H-3,5-dihydro-1,5-benzodiazepin-4-one, m. p. 194°–196 °C., of the formula

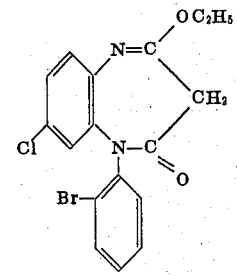

was prepared from 5-(o-bromo-phenyl)-7-chloro-1,5-benzodiazepine-2,4-dione.

EXAMPLE 12

Using a procedure analogous to that described in Example 3, 2-ethoxy-5-(o-nitro-phenyl)-7-chloro-4H-3,5-di-hydro-1,5-benzodiazepin-4-one, m. p. 161°–162°C., of the formula

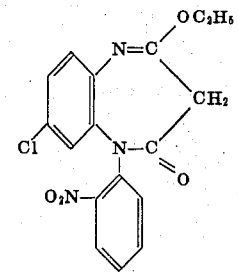

was prepared from 5-(o-nitro-phenyl)-7-chloro-1,5-benzodiazepine-2,4-dione.

EXAMPLE 13

Using a procedure analogous to that described in Example 3, 2-ethoxy-5-(o-trifluoromethyl-phenyl)-7-chloro-4H-3,5-dihydro-1,5-benzodiazepin-4-one, m. p. 123°–125°C., of the formula

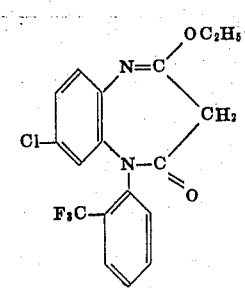

was prepared from 5-(o-trifluoromethyl-phenyl)-7-chloro-1,5-benzodiazepine-2,4-dione.

EXAMPLE 14

Using a procedure analogous to that described in Example 4(b), 2-methylmercapto-5-phenyl-7-nitro-4H-3,5-dihydro-1,5-benzodiazepin-4-one, m. p. 160°–161 °C., of the formula

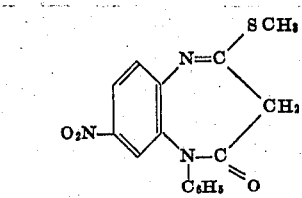

was prepared from 5-phenyl-7-nitro-1,5-benzodiazepin-4-one-2-thione.

EXAMPLE 15

Using a procedure analogous to that described in Example 4(b), 2-methylmercapto-5-phenyl-7-chloro-4H-3,5-di-hydro-1,5-benzodiazepin-4-one, m. p. 113°–115 °C., of the formula

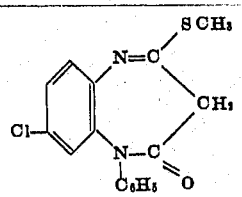

was prepared from 5-phenyl-7-chloro-1,5-benzodiazepin-4-one-2-thione.

The compounds according to the present invention, that is, those embraced by formula I above, have useful pharmacodynamic properties. More particularly, the compounds of the instant invention exhibit psychosedative activities in warm-blooded animals, such as mice, rats and minks.

In addition, the compounds of this invention are useful as intermediates for the preparation of tranquilizers.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective psychosedative dosage unit of the compounds according to the present invention is from 0.016 to 1.67 mgm/kg body weight, preferably 0.083 to 0.84 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 16

Coated Pills

The pill composition is compounded from the following ingredients:

| | |
|---|---|
| 2-Ethoxy-5-phenyl-7-bromo-4H-3,5-dihydro-1,5-benzodiazepin-4-one | 5.0 parts |
| Lactose | 28.5 parts |
| Cornstarch | 15.0 parts |
| Gelatin | 1.0 parts |
| Magnesium stearate | 0.5 parts |
| Total | 50.0 parts |

Preparation

The benzodiazepinone compound is intimately admixed with the lactose and the corn starch, the mixture is moistened with an aqueous 10 percent solution of the gelatin, the moist mass is forced through a 1 mm-mesh screen, the resulting granulate is dried at 40°C. and again passed through the screen, the dry granulate is admixed with the magnesium stearate, and the composition is compressed into 50 mgm-pill cores which are subsequently coated in conventional manner with a thin shell consisting essentially of a mixture of sugar, titanium oxide, talcum and gum arabic, and finally polished with beeswax. Each coated pill contains 5 mgm of the benzodiazepinone compound and is an oral dosage unit composition with effective psychosedative action.

The same result is obtained when an equal amount of 2-ethoxy-5-phenyl-7-trifluoromethyl-4H-3,5-dihydro-1,5-benzodiazepin-4-one was substituted for the benzodiazepinone compound in the above pill core composition.

EXAMPLE 17

Suppositories

The suppository composition is compounded from the following ingredients:

| | |
|---|---|
| 2-Ethoxy-5-phenyl-7-chloro-4H-3,5-dihydro-1,5-benzodiazepin-4-one | 10.0 parts |
| Suppository base (e.g. cocoa butter) | 1690.0 parts |
| Total | 1700.0 parts |

Preparation

The finely pulverized benzodiazepinone compound is blended with the aid of an immersion homogenizer into the suppository base which had previously been melted and cooled to 40°C. 1700 mgm-portions of the resulting composition are poured at 35°C. into cooled suppository molds and allowed to harden. Each suppository contains 10 mgm of the benzodiazepinone compound and is a rectal dosage unit composition with effective psychosedative action.

Analogous results are obtained when any one of the other compounds embraced by formula I is substituted for the particular benzodiazepinone in Examples 16 and 17. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

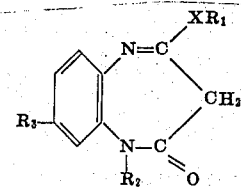

wherein
- $R_1$ is straight or branched alkyl of one to four carbon atoms,
- $R_2$ is phenyl, o-halo-phenyl, o-nitro-phenyl or o-trifluoromethyl-phenyl,
- $R_3$ is halogen, nitro or trifluoromethyl, and
- X is oxygen or sulfur.

2. A compound according to claim 1, which is 2-ethoxy-5-phenyl-7-trifluoromethyl-4H-3,5-dihydro-1,5-benzodiazepin-4-one.

3. A compound according to claim 1, which is 2-ethoxy-5-phenyl-7-bromo-4H-3,5-dihydro-1,5-benzodiazepin-4-one.

4. A compound according to claim 1, which is 2-ethoxy-5-phenyl-7-chloro-4H-3,5-dihydro-1,5-benzodiazepin-4-one.

* * * * *